US012015896B2

(12) United States Patent
Shen et al.

(10) Patent No.: US 12,015,896 B2
(45) Date of Patent: Jun. 18, 2024

(54) PIEZOELECTRIC SPEAKER

(71) Applicant: AAC Kaitai Technologies (Wuhan) CO., LTD, Hubei (CN)

(72) Inventors: Yu Shen, Shenzhen (CN); Qiang Dan, Shenzhen (CN); Yiwei Zhou, Shenzhen (CN); Shiyang Cheng, Shenzhen (CN); Yang Li, Shenzhen (CN)

(73) Assignee: AAC KAITAI TECHNOLOGIES (WUHAN) CO., LTD, Wuhan (CN)

( * ) Notice: Subject to any disclaimer, the term of this patent is extended or adjusted under 35 U.S.C. 154(b) by 189 days.

(21) Appl. No.: 17/880,695

(22) Filed: Aug. 4, 2022

(65) Prior Publication Data

US 2023/0232160 A1 Jul. 20, 2023

(30) Foreign Application Priority Data

Jan. 19, 2022 (CN) ........................ 202210060171.8

(51) Int. Cl.
*H04R 17/00* (2006.01)

(52) U.S. Cl.
CPC .................................... *H04R 17/00* (2013.01)

(58) Field of Classification Search
CPC ......... H04R 17/00; H04R 17/005; H04R 7/10
See application file for complete search history.

(56) References Cited

U.S. PATENT DOCUMENTS

2003/0099371 A1* 5/2003 Ogura .................... H04R 17/00
381/190
2022/0247547 A1* 8/2022 Zerbe .................... H04L 7/0332

* cited by examiner

*Primary Examiner* — Tuan D Nguyen
(74) *Attorney, Agent, or Firm* — W&G Law Group

(57) ABSTRACT

The invention discloses a piezoelectric speaker, including a substrate with a cavity therethrough a supporting structure covering the cavity a first drive structure stacked on the supporting structure, including alternately stacked first electrode layers and first piezoelectric layers a transmission structure stacked on the first drive structure, and a separation slot penetrating the supporting structure and the first drive structure to separate the first drive structure into a first piezoelectric driving part and a second piezoelectric driving part. A rigidity of the transmission structure is less than or equal to a rigidity of the first drive structure, and the rigidity of the first drive structure is less than or equal to a rigidity of the supporting structure. Compared with the prior art, the sound pressure level generated at the same moment is higher.

11 Claims, 4 Drawing Sheets

PIEZOELECTRIC SPEAKER

FIELD OF THE PRESENT DISCLOSURE

The invention relates to the technical field of speakers, in particular to a piezoelectric speaker.

DESCRIPTION OF RELATED ART

As a common electro-acoustic replacement device, speaker is arranged with been widely used in intelligent terminal equipment, and is the key to realize human-computer interaction interface. The miniaturization of electronic devices in smart terminals drives the speaker volume to become smaller and smaller, but it is difficult to obtain a high sound pressure level (SPL) due to the small sound generation area of the miniaturized speaker.

SUMMARY OF THE PRESENT INVENTION

The purpose of the present invention is to provide a piezoelectric speaker to solve the technical problems in the prior art, which can provide a higher sound pressure level.

Accordingly, the present invention provides a piezoelectric speaker, including: a substrate with a cavity therethrough; a supporting structure covering the cavity; a first drive structure stacked on the supporting structure, including alternately stacked first electrode layers and first piezoelectric layers; a transmission structure stacked on the first drive structure; and a separation slot penetrating the supporting structure and the first drive structure to separate the first drive structure into a first piezoelectric driving part and a second piezoelectric driving part. A rigidity of the transmission structure is less than or equal to a rigidity of the first drive structure, and the rigidity of the first drive structure is less than or equal to a rigidity of the supporting structure.

In addition, the piezoelectric speaker further includes a narrow gap through the supporting structure and the first drive structure, the first drive structure includes a plurality of the first piezoelectric driving parts, and the adjacent first piezoelectric driving parts are separated by the narrow gap.

In addition, the first piezoelectric driving parts are annularly spaced through the narrow gap and arranged on an outer side of the second piezoelectric driving part.

In addition, the second piezoelectric driving part is connected with the first piezoelectric driving part or the substrate through a connection beam.

In addition, the first piezoelectric driving part is controlled by the first electrical signal, and the second piezoelectric driving part is controlled by the second electrical signal.

In addition, a phase difference between the first electrical signal and the second electrical signal is equal, and amplitude values are equal but opposite in positive and negative.

In addition, amplitude values of the first electrical signal and the second electrical signal are equal, the positive and negative are the same, but the phases differ by nit.

In addition, the first electrical signal or the second electrical signal is zero.

In addition, the first piezoelectric driving part and the second piezoelectric driving part are driven by the same electric signal.

In addition, the piezoelectric speaker further includes a second driving structure stacked on the first drive structure; wherein the second driving structure is embedded in a side of the transmission structure close to the first drive structure; the second driving structure is greater than or equal to the rigidity of the transmission structure; the rigidity of the supporting structure is greater than or equal to the rigidity of the second driving structure; the second driving structure includes alternately stacked second electrode layers and second piezoelectric layers; the orthographic projection of the separation slot on the transmission structure falls on the second driving structure.

In addition, both the second driving structure and the first drive structure can be driven by the same electric signal, or are driven by different electric signals.

BRIEF DESCRIPTION OF THE DRAWINGS

Many aspects of the exemplary embodiment can be better understood with reference to the following drawings. The components in the drawing are not necessarily drawn to scale, the emphasis instead being placed upon clearly illustrating the principles of the present disclosure.

DETAILED DESCRIPTION OF THE EXEMPLARY EMBODIMENTS

The present disclosure will hereinafter be described in detail with reference to exemplary embodiments. To make the technical problems to be solved, technical solutions and beneficial effects of the present disclosure more apparent, the present disclosure is described in further detail together with the figures and the embodiments. It should be understood the specific embodiments described hereby are only to explain the disclosure, not intended to limit the disclosure.

Embodiment 1

Figure 1:
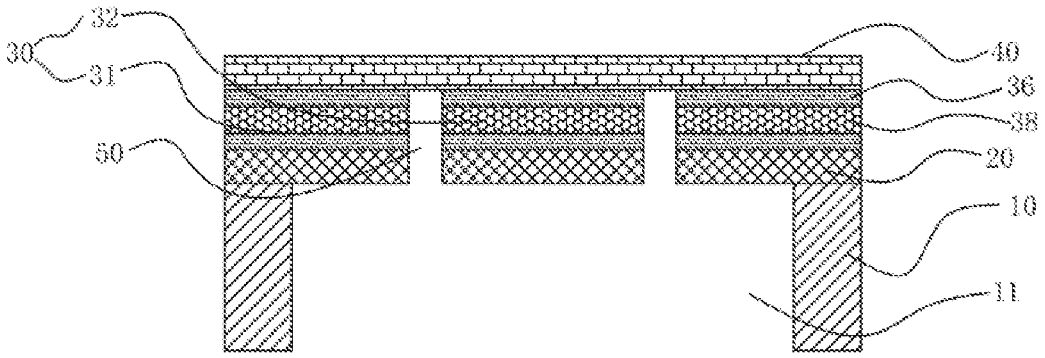
FIG. 1 is a cross-sectional view of a piezoelectric speaker in accordance with a first embodiment of the present invention.

As shown in FIG. 1, the embodiment of the present invention provides a piezoelectric speaker, including a substrate 10, a supporting structure 20, a first drive structure 30 and a transmission structure 40. A cavity 11 runs through the substrate 10, and the cavity 11 is a round slot. Optionally, it can also be set as a rectangular groove or a hexagonal groove or other special-shaped groove structures. In different usage scenarios, it can be adjusted according to usage needs, which is not limited here. In some embodiments, the materials of the transmission structure 40 include, but are not limited to, any of the following: Flexible base, metal base or non-metal base, as a preferred way, the material of the flexible base can be selected but not limited to any of the following: Polydimethylsiloxane (PDMS), polyethylene (PE) or polyimide (PI).

The supporting structure 20 is disposed on the substrate 10 and covers the cavity 11. the shape of the supporting structure 20 is adapted to the formation of the cavity 11. In some embodiments, the material of the supporting structure 20 includes but is not limited to any of the following: harder materials such as SOI, SiN or metals.

The first drive structure 30 is stacked on the supporting structure 20, and the first drive structure 30 includes first electrode layers 36 and first piezoelectric layers 38 stacked alternately. When the corresponding control voltage is applied to the first piezoelectric layer 38, the first piezoelectric layer 38 converts the electrical energy into mechanical power. The first drive structure 30 is deformed to sound waves in the corresponding frequency band. The overall rigidity of the first drive structure 30 should not be too large to prevent sufficient out-of-plane displacement. It can't be too small to prevent itself from arching warping. A specific preferred solution is that the rigidity of the first drive structure 30 is less than or equal to the rigidity of the supporting structure 20.

By applying different voltages to the first electrode layer 36 and the second piezoelectric layer 38, displacements of different degrees and directions can be generated, so as to flexibly adjust the output sound. Those skilled in the art can know that the number of layers of the first electrode layer 36 and the first piezoelectric layer 38 can be adaptively changed according to the actual situation, which is not limited here, and an insulation layer can also be set.

In some embodiments, the material of the first piezoelectric layer 38 includes, but is not limited to, any of the following: PZT piezoelectric ceramics, zinc oxide, aluminum nitride or lead magnesium niobate-lead titanate polyvinylidene fluoride, the material of the first electrode layer 36 includes but is not limited to any of the following: Platinum, Gold, Chrome or Aluminum.

The transmission structure 40 is stacked on the first drive structure 30, and the transmission structure 40 is preferably a flat membrane structure. In order to prevent the transmission of the force strain from being hindered, the overall rigidity of the transmission structure 40 is set to be small. A specific preferred solution is that the overall rigidity of the transmission structure 40 is less than or equal to the overall rigidity of the first drive structure 30.

The piezoelectric speaker also includes a separation slot 50 that runs through the supporting structure 20 and the first drive structure 30 along the axis direction of the cavity 11 to separate the first drive structure 30 into a first piezoelectric driving part 31 and a second piezoelectric driving part 32. The first piezoelectric driving part 31 and the second piezoelectric driving part 32 can be jointly driven by the drive control signal to move. Meanwhile, the rigidity of the transmission structure 40 is less than or equal to the rigidity of the first drive structure 30, and the rigidity of the first drive structure 30 is less than or equal to the rigidity of the supporting structure 20.

Through the embodiment, the first piezoelectric driving part 31 and the second piezoelectric driving part 32 work together, the sound pressure level generated at the same time is higher, and at the same time, due to the existence of the separation slot 50, the overall rigidity of the first drive structure 30 can be adjusted, which reduces the vibration of the first drive structure 30. the self-limiting effect generated when the speaker is generated, thereby increasing the maximum sound pressure output of the speaker.

Further, the first drive structure 30 includes a plurality of the first piezoelectric driving parts 31, and adjacent first piezoelectric driving parts 31 are separated by a narrow gap 60. Those skilled in the art may know that the first drive structure 30 may also be provided with only one first piezoelectric driving part 31, the first piezoelectric driving part 31 is an overall circular structure, and the second piezoelectric driving part 32 is provided at the center of the circular structure.

Figure 2:
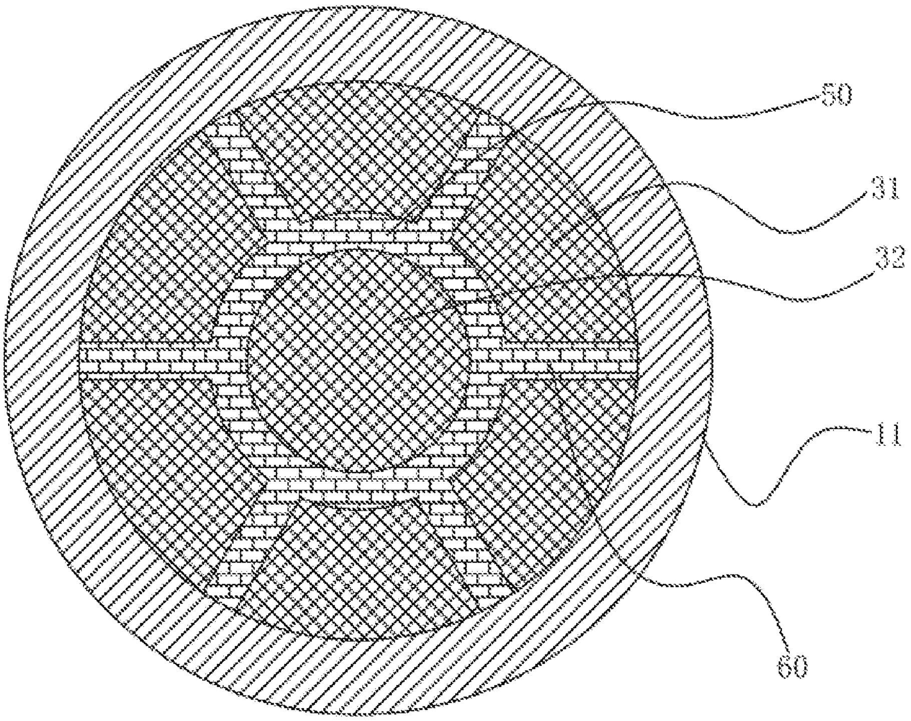
FIG. 2 is a bottom view of the piezoelectric speaker in FIG. 1.
Figure 3:
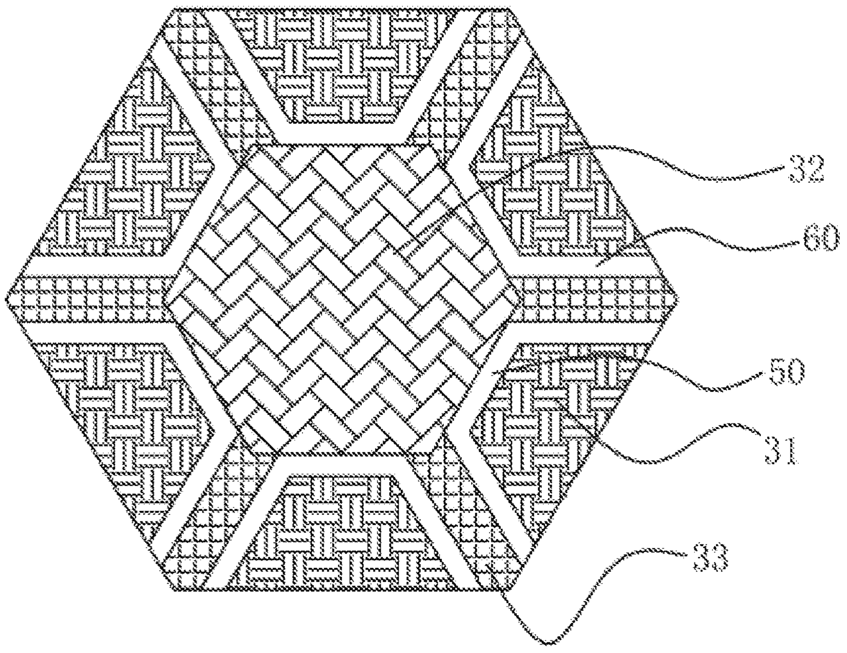
FIG. 3 illustrates a first implementation of a driving structure of the piezoelectric speaker of the first embodiment.
Figure 4:
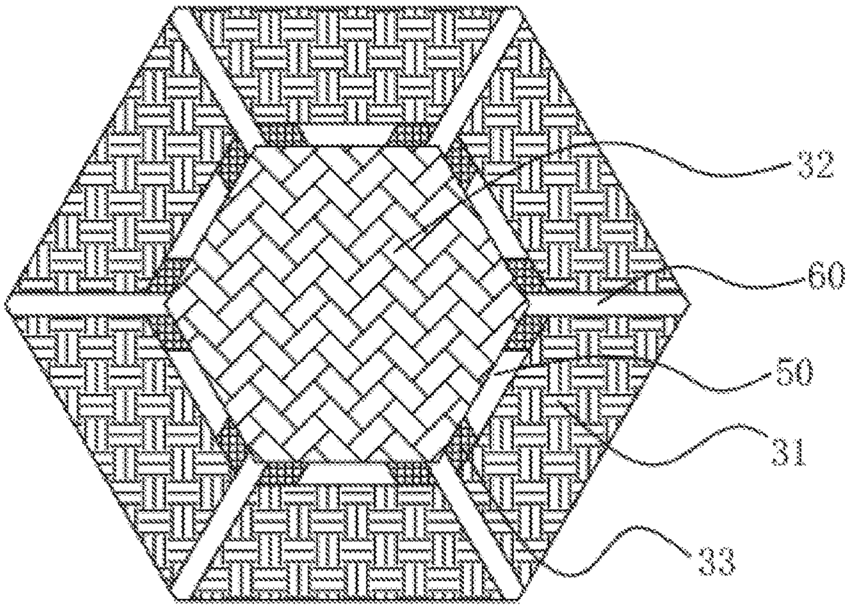
FIG. 4 illustrates a second implementation of the driving structure of the piezoelectric speaker of the first embodiment.

Referring to FIGS. 2-4, the second piezoelectric driving part 32 is located in the middle of the speaker structure, and several first piezoelectric driving parts 31 are annularly spaced and set at the outer side of the second piezoelectric driving part 32. In some embodiments, six of the first piezoelectric driving parts 31 are arranged, centered on the second piezoelectric driving part 32 and spaced annularly by a narrow gap 60. The first piezoelectric driving part 31 and the second piezoelectric driving part 32 are separated by separation slot 50, which is annular groove. Those skilled in the art can know that the number and position of the first piezoelectric driving part 31 can be adapted according to the actual situation, which is not limited here.

Preferably, the piezoelectric speaker can selectively electrify only the first piezoelectric driving part 31 or the second piezoelectric driving part 32. Since the first piezoelectric driving part 31 and the second piezoelectric driving part 32 are separated by separation slot 50, the first piezoelectric driving part 31 and the second piezoelectric driving part 32 can be driven together or independently by an electric signal. In some embodiments, before the first resonant frequency f0 of the piezoelectric speaker, the first piezoelectric driving part 31 and the second piezoelectric driving part 32 are moved together by an electric signal, and a sound wave with a higher sound pressure level is emitted, and the frequency range of the sound wave is 20 Hz-f0. Those skilled in the art can know that the first resonant frequency of the piezoelectric speaker is related to the structure of the piezoelectric speaker itself, and the limit f0 is used to determine the value here.

While the frequency range is within f0-20 kHz, the first piezoelectric driving part 31 or the second piezoelectric driving part 32 can be driven independently by electric signal, so that the speaker emits sound waves with a frequency range of f0-20 kHz. part 32 outside f0 is that the sound pressure level SPL at the resonant frequency can be effectively reduced, thus resulting in ½, ⅓, ¼ of its resonant frequency, the corresponding THD is reduced.

Further, referring to FIG. 3 and FIG. 4, the second piezoelectric driving part 32 is connected with the first piezoelectric driving part 31 or substrate 10 through the connection beam 33, and the purpose of the connection beam 33 structure is to facilitate the passage of the circuit.

In some embodiments, the first piezoelectric driving part 31 is controlled by the first electrical signal, and the second piezoelectric driving part 32 is controlled by the second electrical signal, and the first electrical signal and the second electrical signal are preferably equal in amplitude value but opposite in positive and negative, and same in phase. In other embodiments, the amplitude values of the first electrical signal and the second electrical signal are equal, and the positive and negative are the same, but the phase difference is nit.

In some embodiments, the first piezoelectric driving part 31 and the second piezoelectric driving part 32 are both driven by the same electric signal.

If the material of the first piezoelectric layer 38 is aluminum nitride, the first electrode of the first piezoelectric driving part 31 can be connected to a positive AC voltage (such as AC=A sin(2πft), A is the amplitude, >0, f is the frequency), and the second electrode can be grounded; the first electrode of the second piezoelectric driving part 32 can be grounded, and the second electrode can also be connected to a positive AC voltage, the voltage is AC=A sin(2πft).

If the material of the first piezoelectric layer 38 is PZT, the first electrode of the first piezoelectric driving part 31 can be connected to a positive AC voltage and a positive DC voltage (such as AC+DC), and the second electrode can be grounded; the first electrode of the second piezoelectric driving part 32 can be grounded, and the second electrode can be connected to AC+DC. Part of the structure is shown in FIG. 3, the electric signal controlling the second piezoelectric driving part 32 can be routed by the connection beam 33 of the second piezoelectric driving part 32 and the substrate 10.

The OR circuit sends out an original signal, and a portion is retained by the switching device. For example, AC=A sin(2πft), another part of the electric signal is 180° out of phase with the initial phase, such as AC=A sin(2πft+nπ), n=1, 2, 3, . . . . Part of the structure is shown in FIG. 4. the electric signal controlling the second piezoelectric driving part 32 can be routed by the connection beam 33 of the second piezoelectric driving part 32 and the first piezoelectric driving part 31, and the electrode wiring on the first piezoelectric driving part 31 is electrically isolated from the wiring of the second piezoelectric driving part 32.

In some embodiments, both the first piezoelectric driving part 31 and the second piezoelectric driving part 32 are driven by the same electric signal, the positive (or negative) pole of the first piezoelectric driving part 31 and the positive (or negative) pole of the second piezoelectric driving part 32 are electrically connected together at the outermost circle of the structure.

Figure 5:
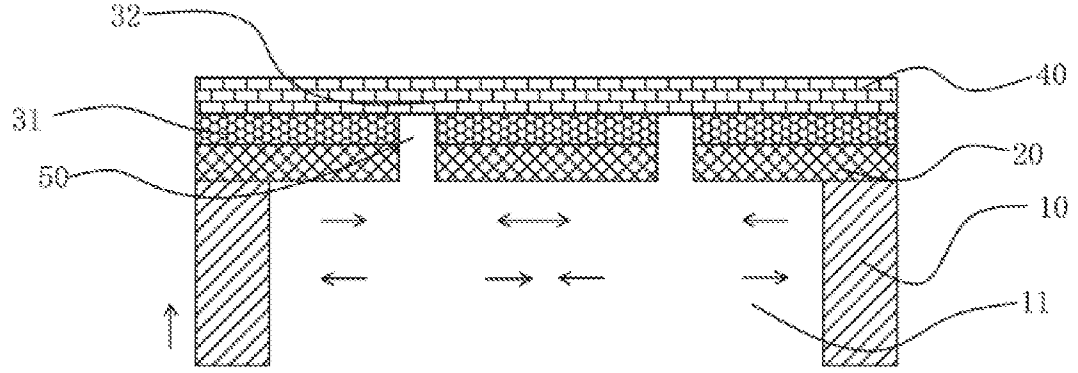
FIG. 5 illustrates a working state of the piezoelectric speaker.
Figure 6:
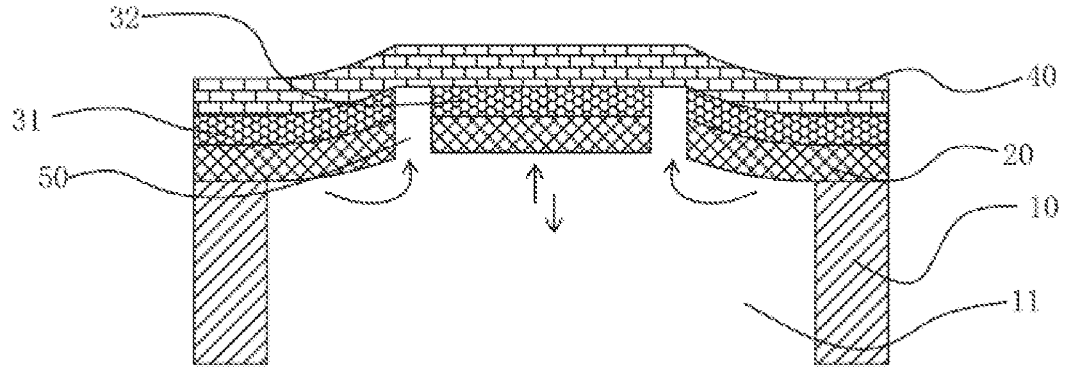
FIG. 6 illustrates another working state of the piezoelectric speaker.
Figure 7:
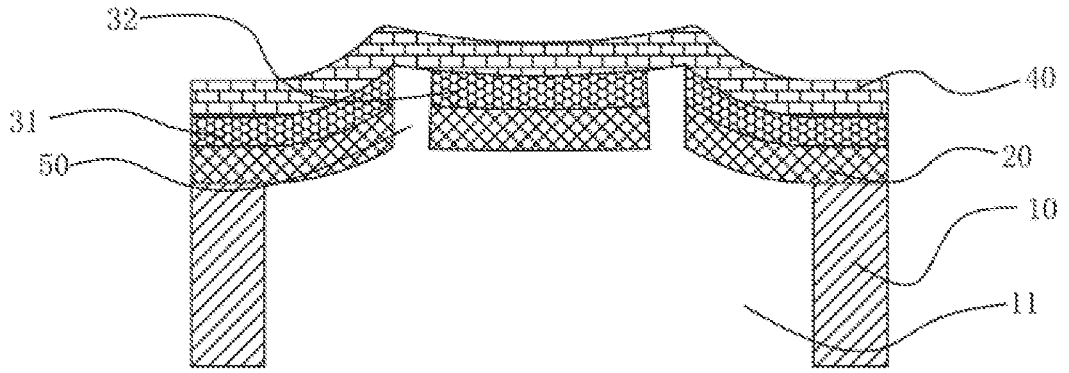
FIG. 7 illustrates another working state of the piezoelectric speaker.

Referring to FIGS. 5-7, one end of the first piezoelectric driving part 31 is connected to the substrate 10, in a clamped state, and the other end is relatively free. When the first piezoelectric driving part 31 (the first electrode layer 36 is omitted) is acted on by an electric field parallel to the vibration direction of the piezoelectric speaker, a telescoping motion is generated in the plane due to the piezoelectric effect. Since the rigidity of first drive structure 30 is inconsistent with that of supporting structure 20 and transmission structure 40, and the relationship between the three is that the rigidity of transmission structure 40 is less than or equal to the rigidity of first drive structure 30, the rigidity of first drive structure 30 is less than or equal to the rigidity of supporting structure 20. The upper surface of the first piezoelectric driving part 31 adjacent to the transmission structure 40 is more stretched than the lower surface adjacent to the supporting structure 20. The surface of the transmission structure 40 adjacent to the first piezoelectric driving part 31 is the first surface, and the surface of the supporting structure 20 adjacent to the first piezoelectric driving part 31 is the second surface. the restraining effect of the supporting structure 20 with greater rigidity, the second surface is arranged with a smaller degree of expansion and contraction than the upper surface. transmission structure 40 is less than or equal to the rigidity of the first drive structure 30, and the expansion and contraction of the first surface is freer than that of the second surface. Therefore, the expansion and contraction of the first surface and the second surface do not match, and the entire device will undergo out-of-plane warping displacement.

Both ends of the second piezoelectric driving part 32 are not supported by the substrate 10, they are in a relatively free state, and can be relatively freely stretched. When subjected to an electric field parallel to the vibration and sounding direction of the piezoelectric speaker, the expansion and contraction of the first surface and the second surface do not match, and the warping of the edge area and the center area of the second piezoelectric driving part 32 is also inconsistent (the possible situation is concave or convex or flat). Working together with the first piezoelectric driving part 31, the warping height of the entire device can be further increased, which can further increase the sound pressure level of the piezoelectric speaker.

Embodiment 2

Figure 8:
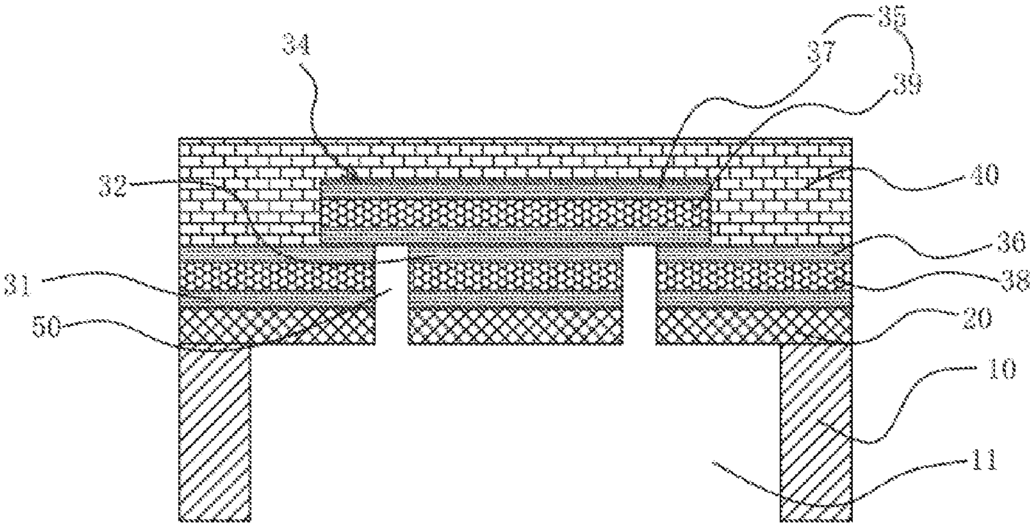
FIG. 8 is a cross-sectional view of a piezoelectric speaker in accordance with a second exemplary embodiment of the present invention.

The difference between this embodiment and the first embodiment is that the piezoelectric speaker further includes a second driving structure 34 stacked on the first drive structure 30, and the second driving structure 34 includes a third piezoelectric driving part 35. The second driving structure 34 is embedded on the side of the transmission structure 40 close to the first drive structure 30. The second driving structure 34 is greater than or equal to the rigidity of the transmission structure 40. The rigidity of the supporting structure 20 is greater than or equal to the rigidity of the second driving structure 34. Specifically, as shown in FIG. 8, adjacent to the transmission structure 40 is the third piezoelectric driving part 35, adjacent to the supporting structure 20 is the first piezoelectric driving part 31 and the second piezoelectric driving part 32. Preferably, the second piezoelectric driving part 32 may not be driven by the electric signal. The structure of the third piezoelectric driving part 35 is the same as that of the first piezoelectric driving part 31, and the electric field direction of the third piezoelectric driving part 35 is opposite to that of the first piezoelectric driving part 31. The third piezoelectric driving part 35 and the first piezoelectric driving part 31 can be driven by the same electric signal or by different electric signals. the orthographic projection of the separation slot 50 on the transmission structure 40 falls on the third piezoelectric driving part 35.

In the first embodiment, the sum of the length of the first piezoelectric driving part 31 extending from the edge to the center, the size of the separation slot 50 and the length of the second piezoelectric driving part 32 is equal to the total chip size.

In the second embodiment, the advantage is that the sum of the length of the first piezoelectric driving part 31, the separation slot 50 size and the length of the third piezoelectric driving part 35 can be larger than the total chip size. obvious that when the length of the third piezoelectric driving part 35 becomes longer, the average height of the whole chip to vibrate out of the plane will become larger, which can further improve the performance of the chip.

It is to be understood, however, that even though numerous characteristics and advantages of the present exemplary embodiments have been set forth in the foregoing description, together with details of the structures and functions of the embodiments, the disclosure is illustrative only, and changes may be made in detail, especially in matters of shape, size, and arrangement of parts within the principles of the invention to the full extent indicated by the broad general meaning of the terms where the appended claims are expressed.

What is claimed is:

1. A piezoelectric speaker, including:

a substrate with a cavity therethrough;

a supporting structure covering the cavity;

a first drive structure stacked on the supporting structure, including alternately stacked first electrode layers and first piezoelectric layers;

a transmission structure stacked on the first drive structure;

a separation slot penetrating the supporting structure and the first drive structure to separate the first drive structure into a first piezoelectric driving part and a second piezoelectric driving part; wherein a rigidity of the transmission structure is less than or equal to a rigidity of the first drive structure, and the rigidity of the first drive structure is less than or equal to a rigidity of the supporting structure.

2. The piezoelectric speaker as described in claim 1 further including a narrow gap through the supporting structure and the first drive structure, the first drive structure includes a plurality of the first piezoelectric driving parts, and the adjacent first piezoelectric driving parts are separated by the narrow gap.

3. The piezoelectric speaker as described in claim 2, wherein the first piezoelectric driving parts are annularly spaced through the narrow gap and arranged on an outer side of the second piezoelectric driving part.

4. The piezoelectric speaker as described in claim 1, wherein the second piezoelectric driving part is connected with the first piezoelectric driving part or the substrate through a connection beam.

5. The piezoelectric speaker as described in claim 1, wherein the first piezoelectric driving part is controlled by the first electrical signal, and the second piezoelectric driving part is controlled by the second electrical signal.

6. The piezoelectric speaker as described in claim 5, wherein a phase difference between the first electrical signal and the second electrical signal is equal, and amplitude values are equal but opposite in positive and negative.

7. The piezoelectric speaker as described in claim 5, wherein amplitude values of the first electrical signal and the second electrical signal are equal, the positive and negative are the same, but the phases differ by nit.

8. The piezoelectric speaker as described in claim 5, wherein the first electrical signal or the second electrical signal is zero.

9. The piezoelectric speaker as described in claim 1, wherein the first piezoelectric driving part and the second piezoelectric driving part are driven by the same electric signal.

10. The piezoelectric speaker as described in claim 1, further including a second driving structure stacked on the first drive structure; wherein the second driving structure is embedded in a side of the transmission structure close to the first drive structure; the second driving structure is greater than or equal to the rigidity of the transmission structure; the rigidity of the supporting structure is greater than or equal to the rigidity of the second driving structure; the second driving structure includes alternately stacked second electrode layers and second piezoelectric layers; the orthographic projection of the separation slot on the transmission structure falls on the second driving structure.

11. The piezoelectric speaker as described in claim 10, wherein both the second driving structure and the first drive structure can be driven by the same electric signal, or are driven by different electric signals.

* * * * *